United States Patent
Chen et al.

(10) Patent No.: US 9,450,515 B2
(45) Date of Patent: Sep. 20, 2016

(54) METHOD FOR CONTROLLING INVERTER APPARATUS BY DETECTING PRIMARY-SIDE OUTPUT AND INVERTER APPARATUS THEREOF

(71) Applicant: FSP TECHNOLOGY INC., Taoyuan (TW)

(72) Inventors: Han-Wei Chen, Taoyuan (TW); Chun-Hao Yu, Taoyuan (TW); Chia-Hua Liu, Taoyuan (TW)

(73) Assignee: FSP TECHNOLOGY INC., Taoyuan (TW)

(*) Notice: Subject to any disclaimer, the term of this patent is extended or adjusted under 35 U.S.C. 154(b) by 0 days.

(21) Appl. No.: 14/629,462

(22) Filed: Feb. 23, 2015

(65) Prior Publication Data

US 2015/0244255 A1    Aug. 27, 2015

Related U.S. Application Data

(60) Provisional application No. 61/944,587, filed on Feb. 26, 2014.

(30) Foreign Application Priority Data

Jan. 30, 2015   (TW) .............................. 104103281 A

(51) Int. Cl.
| | |
|---|---|
| *H02M 1/36* | (2007.01) |
| *H02M 7/537* | (2006.01) |
| *H02M 7/48* | (2007.01) |
| *H02M 1/44* | (2007.01) |
| *H02M 1/00* | (2006.01) |

(52) U.S. Cl.
CPC ................. *H02M 7/48* (2013.01); *H02M 1/44* (2013.01); *H02M 2001/007* (2013.01); *H02M 2001/0022* (2013.01); *H02M 2001/0032* (2013.01); *H02M 2001/0058* (2013.01); *Y02B 70/1491* (2013.01); *Y02B 70/16* (2013.01)

(58) Field of Classification Search
CPC .............. H02M 2001/007; H02M 2001/0074; H02M 2001/0067; H02M 1/36; H02M 7/537
See application file for complete search history.

(56) References Cited

U.S. PATENT DOCUMENTS

| | | | | |
|---|---|---|---|---|
| 7,529,106 | B2 * | 5/2009 | Hikosaka | H02M 3/33592 363/17 |
| 8,319,378 | B2 * | 11/2012 | Fornage | G05F 1/67 307/140 |
| 2005/0110454 | A1 * | 5/2005 | Tsai | G05F 1/67 320/101 |
| 2005/0275386 | A1 * | 12/2005 | Jepsen | H02M 7/4807 322/9 |
| 2007/0045286 | A1 * | 3/2007 | Mizuno | H02M 7/4807 219/501 |
| 2010/0156185 | A1 * | 6/2010 | Kim | H01M 16/003 307/72 |
| 2011/0130889 | A1 * | 6/2011 | Khajehoddin | H02J 3/383 700/298 |

\* cited by examiner

*Primary Examiner* — Emily P Pham
(74) *Attorney, Agent, or Firm* — Winston Hsu; Scott Margo

(57) ABSTRACT

A control method for an inverter apparatus is provided. The inverter apparatus includes a direct current to direct current (DC/DC) converter and a direct current to alternating current (DC/AC) converter. An output side of the DC/DC converter is coupled to an input side of the DC/AC converter. The control method includes the following steps: outputting a DC power from the output side of the DC/DC converter; receiving the DC power from the input side of the DC/AC converter, and generating an AC power from an output side of the DC/AC converter according to the DC power; and detecting the DC power, and accordingly controlling an operation of the DC/AC converter.

16 Claims, 4 Drawing Sheets

METHOD FOR CONTROLLING INVERTER APPARATUS BY DETECTING PRIMARY-SIDE OUTPUT AND INVERTER APPARATUS THEREOF

CROSS REFERENCE TO RELATED APPLICATIONS

This application claims the benefit of U.S. provisional application No. 61/944,587, filed on Feb. 26, 2014, the contents of which are incorporated herein by reference.

BACKGROUND OF THE INVENTION

1. Field of the Invention

The disclosed embodiments of the present invention relate to an inverter apparatus, and more particularly, to a method for controlling an inverter apparatus by detecting a direct current (DC) bus voltage, and a related inverter apparatus.

2. Description of the Prior Art

In a conventional inverter apparatus, a direct current to direct current (DC/DC) converter receives a DC power outputted from a photovoltaic module (PV module), boosts the received DC power, and transmits the boosted DC power to a direct current to alternating current (DC/AC) converter. Next, the DC/AC converter converts the boosted DC power to an AC power. As the PV module is easily affected by the surrounding environment (e.g. the sky is obscured by clouds, or the PV module is shaded by bird droppings or dead leafs), the inverter apparatus often receives a reduced power from the PV module. However, when an output power of the inverter apparatus is too low (at a light load condition), light-load efficiency thereof degrades.

Thus, a novel control method for an inverter apparatus is needed to solve the problems of low inverter efficiency due to changes in surrounding environment.

SUMMARY OF THE INVENTION

It is therefore one objective of the present invention to provide a method for controlling an inverter apparatus by detecting a direct current (DC) bus voltage, and a related inverter apparatus to solve the above problems.

According to an embodiment of the present invention, an exemplary control method for an inverter apparatus is disclosed. The inverter apparatus comprises a direct current to direct current (DC/DC) converter and a direct current to alternating current (DC/AC) converter. An output side of the DC/DC converter is coupled to an input side of the DC/AC converter. The control method comprises the following steps: outputting a DC power from the output side of the DC/DC converter; receiving the DC power from the input side of the DC/AC converter, and generating an AC power from an output side of the DC/AC converter according to the DC power; and detecting the DC power, and accordingly controlling an operation of the DC/AC converter.

According to an embodiment of the present invention, an exemplary inverter apparatus is disclosed. The exemplary inverter apparatus comprises a direct current to direct current (DC/DC) converter, a direct current to alternating current (DC/AC) converter and a controller. The DC/DC converter is arranged for outputting a DC power. The DC/AC converter is coupled to the DC/DC converter, and is arranged for receiving the DC power, and generating an AC power according to the DC power. The controller is coupled to the DC/AC converter, and is arranged for detecting the DC power, and accordingly controlling an operation of the DC/AC converter.

The proposed control method for an inverter apparatus may eliminate/mitigate effects of surrounding environment on operating efficiency of the inverter apparatus by detecting a primary-side output (DC bus voltage), thereby improving light-load operating performance of the inverter apparatus.

These and other objectives of the present invention will no doubt become obvious to those of ordinary skill in the art after reading the following detailed description of the preferred embodiment that is illustrated in the various figures and drawings.

DETAILED DESCRIPTION

In order to enhance inverter efficiency at a light load condition, the proposed control method for an inverter apparatus may detect a DC bus voltage (e.g. a DC power outputted from a DC/DC converter) directly, and accordingly determine whether to operate the inverter apparatus in a burst mode to thereby enhance operating efficiency thereof. To facilitating an understanding of the present invention, the proposed inverter apparatus is implemented by a photovoltaic inverter in the following for illustrative purposes. However, the proposed control method for an inverter apparatus is not limited to be employed in a photovoltaic inverter. Further description is provided below.

Figure 1:
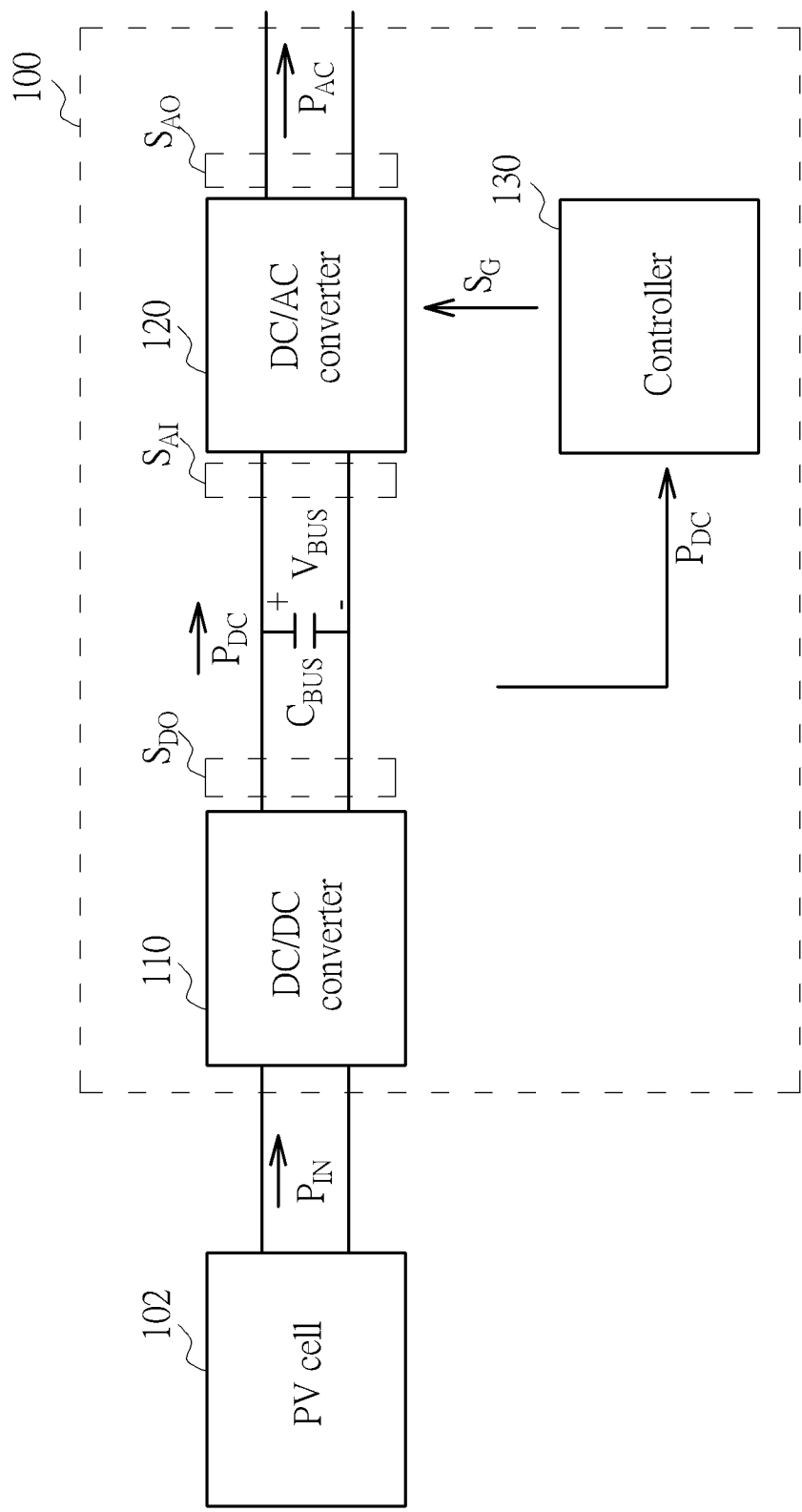
FIG. 1 is a block diagram illustrating an exemplary inverter apparatus according to an embodiment of the present invention.

Please refer to FIG. 1, which is a block diagram illustrating an exemplary inverter apparatus according to an embodiment of the present invention. The inverter apparatus 100 is coupled to a photovoltaic cell (PV cell) 102, and may include, but is not limited to, a DC/DC converter 110, a DC/AC converter 120 and a controller 130. The DC/DC converter 110 may receive an input power $P_{IN}$ provided by the PV cell 102, and accordingly output a DC power $P_{DC}$ (e.g. a DC bus voltage $V_{BUS}$) from an output side $S_{DO}$. The output side $S_{DO}$ of the DC/DC converter 110 is coupled to an input side $S_{AI}$ of the DC/AC converter 120. The DC/AC converter 120 is arranged for receiving the DC power $P_{DC}$, and generating an AC power $P_{AC}$ according to the DC power $P_{DC}$. By way of example but not limitation, the DC/DC converter 110 may be implemented by an LLC resonant converter, which may provide soft switching to increase conversion efficiency and reduce electromagnetic interference (EMI). Further, the DC/AC converter 120 may be referred to as a DC/AC inverter.

The controller 130 is coupled to the DC/AC converter 120, and is arranged for detecting the DC power $P_{DC}$ and accordingly controlling an operation of the DC/AC converter 120. For example, the controller 130 may directly receive a voltage drop across a DC bus capacitor $C_{BUS}$ (i.e. the DC bus voltage $V_{BUS}$) to detect the DC power $P_{DC}$. In another example, the voltage drop across the DC bus capacitor $C_{BUS}$ may be coupled to the controller 130 through a voltage divider circuit (not shown in FIG. 1), and the controller 130 may detect the DC power $P_{DC}$ according to voltage information received from the voltage divider circuit. In still another example, the DC/DC converter 110 may further output the DC power $P_{DC}$ to the controller 130 for DC bus voltage detection.

Figure 2:
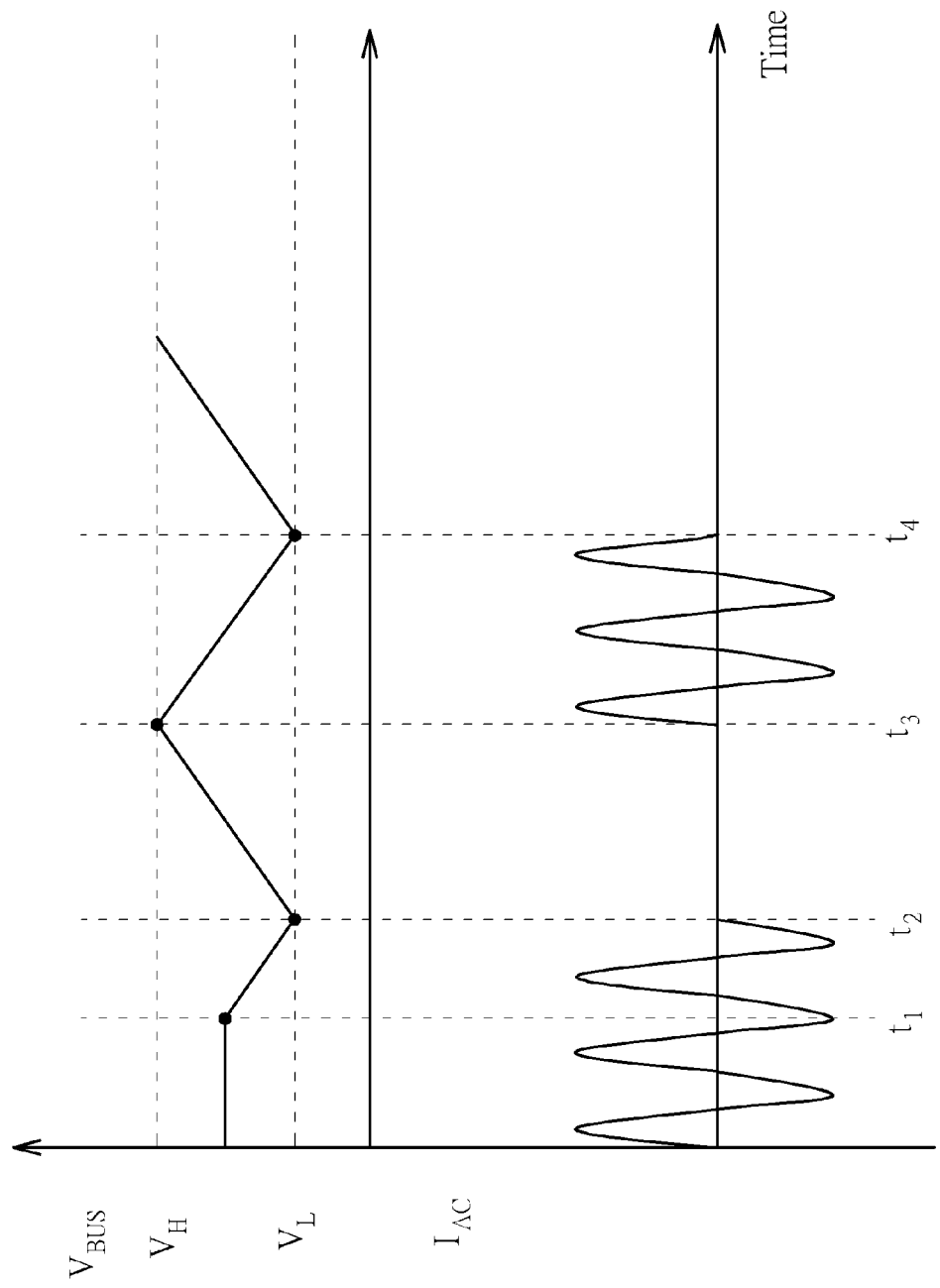
FIG. 2 is a waveform diagram illustrating waveforms of a primary-side output and a secondary-side output of the inverter apparatus shown in FIG. 1 according to an embodiment of the present invention.

When the controller 130 detects that the DC power $P_{DC}$ meets a switching criterion, the controller 130 may control an operation mode of the inverter apparatus 100 accordingly. Please refer to FIG. 2 in conjunction with FIG. 1. FIG. 2 is a waveform diagram illustrating waveforms of a primary-side output (the DC bus voltage $V_{BUS}$) and a secondary-side output (a current level $I_{AC}$ of the AC power $P_{AC}$) of the inverter apparatus 100 shown in FIG. 1 according to an embodiment of the present invention. Before a point in time $t_1$, the inverter apparatus 100 operates in a normal mode. At the point in time $t_1$, a primary power of the inverter apparatus 100 starts to drop due to changes in surrounding environment. For example, when the sky is obscured by clouds, an output power of the inverter apparatus 100 may be greater than a power supplied by the PV cell 102, which makes the DC bus voltage $V_{BUS}$ start to decline. In this embodiment, when the controller 130 detects that the DC bus voltage $V_{BUS}$ decreases to a lower bound level $V_L$ (a point in time $t_2$), the controller 130 turns off the DC/AC converter 120 to stop a switching operation, thus making the DC bus voltage $V_{BUS}$ start to rise. For example, the controller 130 may turn off DC/AC converter 120 by decreasing a duty cycle of a pulse width modulation (PWM) signal $S_G$ (used for controlling the operation of the DC/AC converter 120), setting the PWM signal $S_G$ to a low level, or stopping providing the PWM signal $S_G$ to the DC/AC converter 120.

After the controller 130 turns off the DC/AC converter 120, the controller 130 may continue detecting the DC power $P_{DC}$ to avoid that an energy level of the DC power $P_{DC}$ is too high to damage circuit elements. In this embodiment, when the controller 130 detects that the DC bus voltage $V_{BUS}$ raises to an upper bound level $V_H$ (a point in time $t_3$), the controller 130 may turn on the DC/AC converter 120 to activate an inverting operation. For example, the controller 130 may enable the DC/AC converter 120 to output the AC power $P_{AC}$ by increasing the duty cycle of the PWM signal $S_G$ or providing again the PWM signal $S_G$ to the DC/AC converter 120. When the controller 130 detects that the DC bus voltage $V_{BUS}$ declines to the lower bound level $V_L$ again (a point in time $t_4$), the controller 130 may repeat the operations described above to increase light-load efficiency of the inverter apparatus 100.

Figure 3:
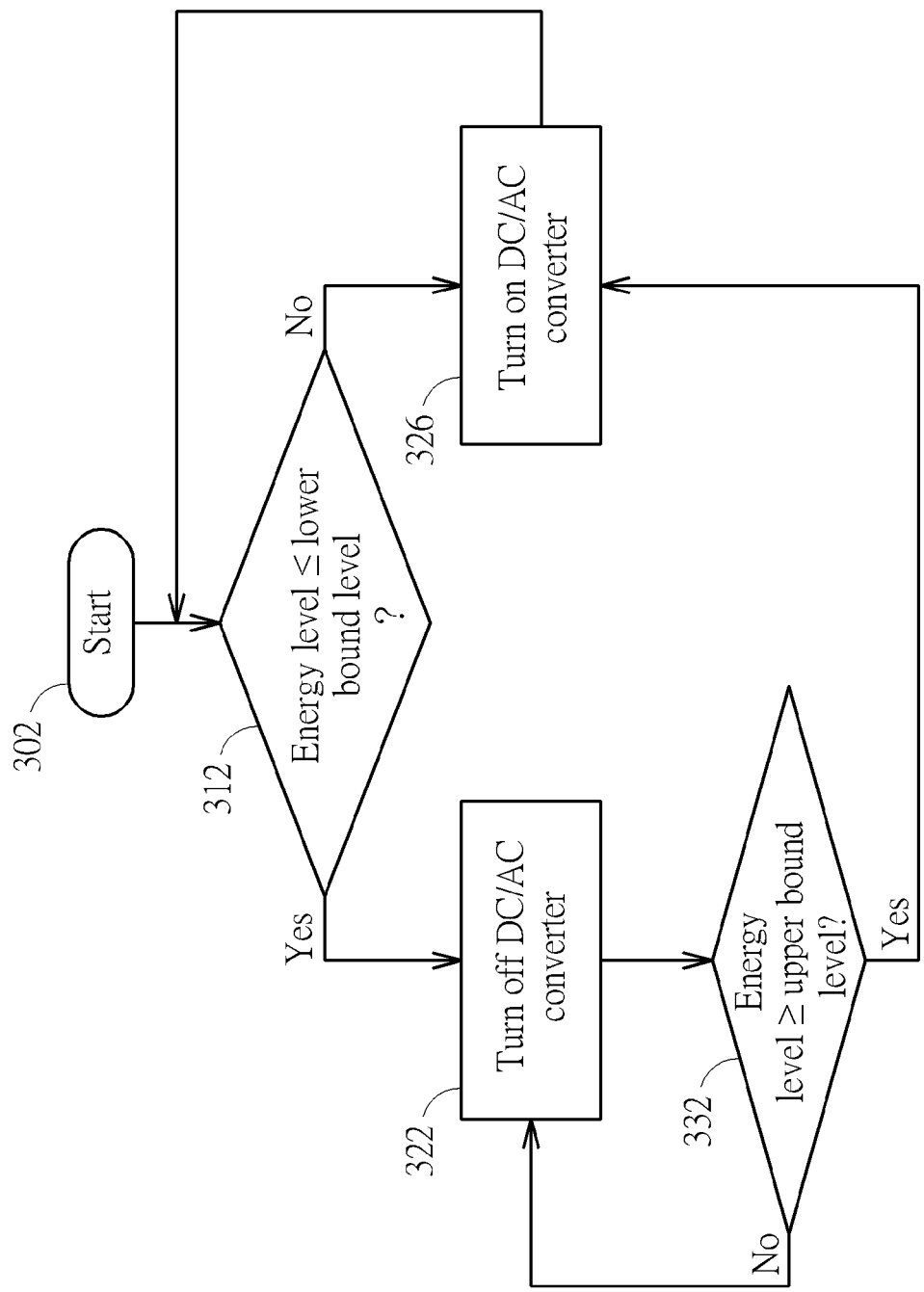
FIG. 3 is a flow chart of an exemplary control method for an inverter apparatus according to an embodiment of the present invention.

The aforementioned control mechanism of the inverter apparatus 100 may be summarized in a flow chart shown in FIG. 3. Please refer to FIG. 3 in conjunction with FIG. 1 and FIG. 2. FIG. 3 is a flow chart of an exemplary control method for an inverter apparatus according to an embodiment of the present invention, wherein the control method may be employed in the inverter apparatus 100 shown in FIG. 1. Please note that the execution order of steps shown in FIG. 3 is for illustrative purposes only. Provided that the result is substantially the same, the steps are not required to be executed in the exact order shown in FIG. 3. The control method shown in FIG. 3 may be summarized as follows.

Step 302: Start.

Start 312: Detect if an energy level of the DC power $P_{DC}$ of the inverter apparatus 100 (e.g. a voltage level of a primary-side output; a voltage level of the DC bus voltage $V_{BUS}$) is less than or equal to a lower bound level (e.g. the lower bound level $V_L$). If yes, go to step 322; otherwise, go to step 326.

Step 322: Turn off the DC/AC converter 120.

Step 326: Turn on the DC/AC converter 120.

Step 332: Detect if the energy level of the DC power $P_{DC}$ of the inverter apparatus 100 is greater than or equal to an upper bound level (e.g. the upper bound level $V_H$). If yes, go to step 326; otherwise, go to step 322.

In step 302, the DC/AC converter 120 of the inverter 100 may stay activated (e.g. before the point in time $t_2$, or between the points in time $t_3$ and $t_4$ shown in FIG. 2). In step 312, the controller 130 may set the lower bound level (e.g. 380 volts) according to a rated output power (e.g. a mains supply voltage) of the DC/AC converter 120, thereby ensuring that the inverter apparatus 100 can provide sufficient power. In step 332, the controller 130 may set the upper bound level (e.g. 410 volts) according to electrical specifications (e.g. voltage withstand ability) of the inverter apparatus 100. Additionally, in step 312 and/or step 332, the energy level is not limited to a voltage level of the DC power $P_{DC}$. For example, the controller 130 may detect a power level or a current level of the DC power $P_{DC}$. As a person skilled in the art should understand the operation of each step shown in FIG. 3 after reading the paragraphs directed to FIG. 1 and FIG. 2, further description is omitted here for brevity.

Figure 4:
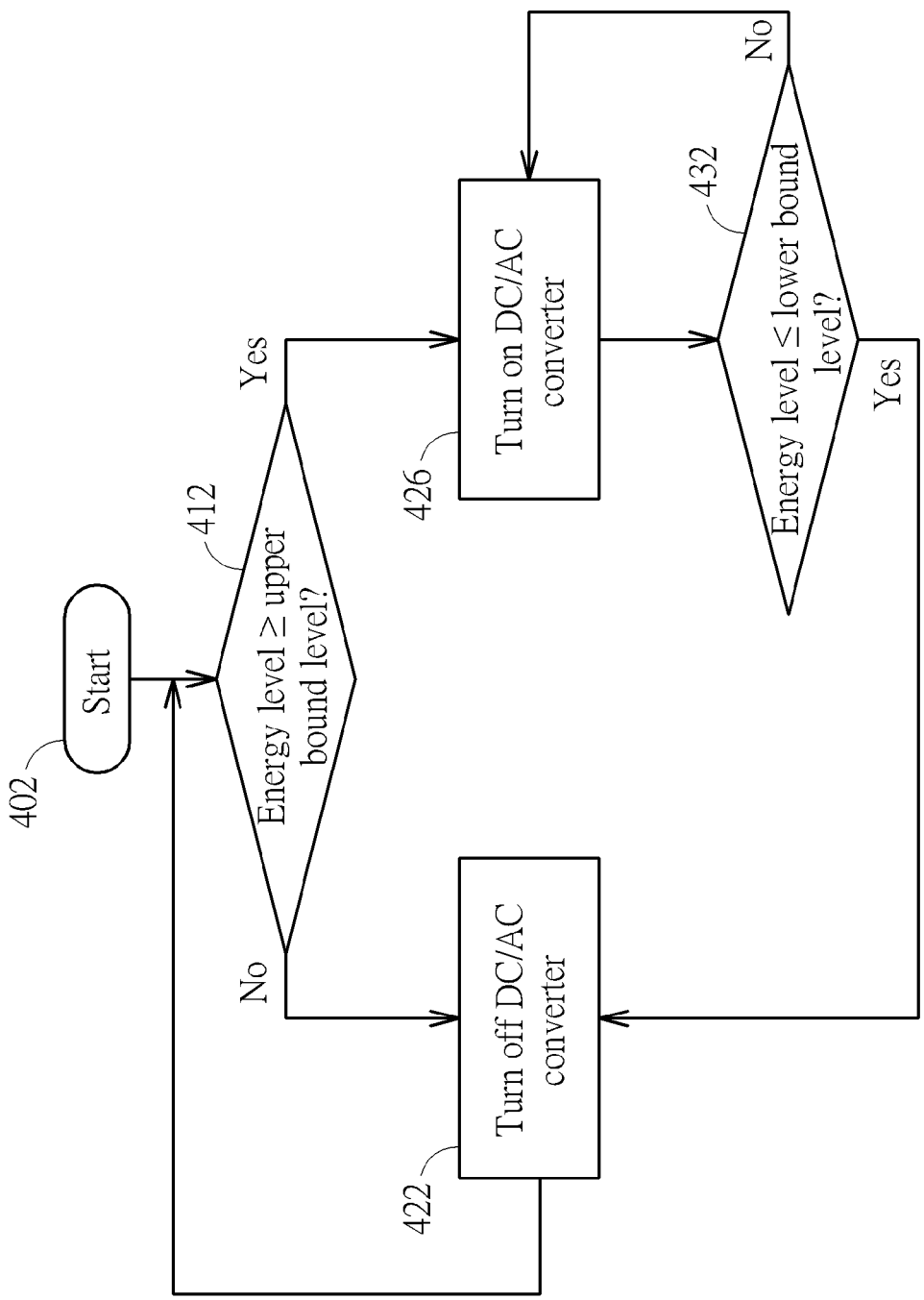
FIG. 4 is a flow chart of an exemplary control method for an inverter apparatus according to another embodiment of the present invention.

In an alternative design, the controller 130 may first detect if the energy level of the DC power $P_{DC}$ is greater than an upper bound level, and then control the operation of the DC/AC converter 120 accordingly. Please refer to FIG. 4 in conjunction with FIG. 1 and FIG. 2. FIG. 4 is a flow chart of an exemplary control method for an inverter apparatus according to another embodiment of the present invention, wherein the control method may be employed in the inverter apparatus 100 shown in FIG. 1. Please note that the execution order of steps shown in FIG. 4 is for illustrative purposes only. Provided that the result is substantially the same, the steps are not required to be executed in the exact order shown in FIG. 4. The control method shown in FIG. 4 may be summarized as follows.

Step 402: Start.

Start 412: Detect if an energy level of the DC power $P_{DC}$ of the inverter apparatus 100 (e.g. a voltage level of a primary-side output; a voltage level of the DC bus voltage $V_{BUS}$) is greater than or equal to an upper bound level (e.g. the upper bound level $V_H$). If not, go to step 422; otherwise, go to step 426.

Step 422: Turn off the DC/AC converter 120.

Step 426: Turn on the DC/AC converter 120.

Step 432: Detect if the energy level of the DC power $P_{DC}$ of the inverter apparatus 100 is less than or equal to a lower bound level (e.g. the lower bound level $V_L$). If yes, go to step 422; otherwise, go to step 426.

In step 402, the DC/AC converter 120 of the inverter 100 may stay inactivated (e.g. between the points in time $t_2$ and $t_3$ shown in FIG. 2). Similarly, the lower bound level (e.g. 380 volts) may be set according to a rated output power (e.g. a mains supply voltage) of the DC/AC converter 120, and/or the upper bound level (e.g. 410 volts) may be set according to electrical specifications (e.g. voltage withstand ability) of the inverter apparatus 100. Additionally, the controller 130 may detect a power level or a current level of the DC power $P_{DC}$. As a person skilled in the art should understand the operation of each step shown in FIG. 4 after reading the paragraphs directed to FIGS. 1-3, further description is omitted here for brevity.

In view of the above, a switching criterion (or switching criteria) used in the proposed control mechanism may be "an energy level of the DC power $P_{DC}$ is less than or equal to a lower bound level" and/or "an energy level of the DC power $P_{DC}$ is greater than or equal to an upper bound level". Hence, the light-load efficiency of the inverter apparatus 100 may be improved effectively. It should be noted that the controller 130 shown in FIG. 1 may determine an operating status of the DC/AC converter 120 before detecting the DC bus voltage $V_{BUS}$. For example, the controller 130 may first determine the operating status of the DC/AC converter 120, and then accordingly determine whether the lower bound level $V_L$ shown in FIG. 2 (e.g. the flow chart shown in FIG. 3) or the upper bound level $V_H$ shown in FIG. 2 (e.g. the flow chart shown in FIG. 4) should be first referred to for detection of the DC bus voltage $V_{BUS}$.

Further, the proposed inverter architecture disposes a controller at a secondary side of an inverter apparatus. This not only improves light-load efficiency of the inverter apparatus but also solves the problem of needing additional feedback mechanism to control an output of a DC/DC converter. Specifically, a conventional inverter apparatus disposes a controller at a primary side (a DC/DC converter) only. In order to maintain a stable output power of the DC/DC converter (e.g. 400 volts), a control signal of an DC/AC converter at a secondary side (or a load side) has to be fed back to the controller at the primary side, so that the controller adjusts the output of the DC/DC converter accordingly.

In contrast to the conventional inverter architecture, the proposed inverter architecture may dispose a controller at the secondary side to control the DC/DC converter, and accordingly provide a stable primary-side output without conventional feedback mechanism. For example, the inverter apparatus 100 shown in FIG. 1 may further include another controller coupled to the DC/DC converter 100 (different from the controller 130; not shown in FIG. 1). In other words, each of a primary side and a secondary side of the inverter apparatus 100 shown in FIG. 1 may include one controller. As the controller 130 may detect a power output at the primary side (i.e. the DC power $P_{DC}$ or the DC bus voltage $V_{BUS}$), the controller 130 may directly refer to the obtained detection result to control whether the DC/AC converter 120 enters into a burst mode, thereby controlling a power output of the DC/DC converter 110. Additionally, as the controller 130 may already include pin(s) for voltage detection (e.g. detecting the DC bus voltage $V_{BUS}$), the proposed inverter architecture requires no additional circuit area and cost.

To sum up, the proposed control method for an inverter apparatus may eliminate/mitigate effects of surrounding environment on operating efficiency of the inverter apparatus by detecting an output of a primary-side output (DC bus voltage), thereby improving light-load operating performance of the inverter apparatus. Additionally, the proposed inverter apparatus may couple a primary-side output to a controller at a secondary side, thereby increasing light-load efficiency without additional circuits. Hence, the proposed inverter apparatus may have a compact circuit structure and require almost no additional cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method for an inverter apparatus, the inverter apparatus comprising a direct current to direct current (DC/DC) converter and a direct current to alternating current (DC/AC) converter, an output side of the DC/DC converter being coupled to an input side of the DC/AC converter, the control method comprising:
   outputting a DC power from the output side of the DC/DC converter;
   receiving the DC power from the input side of the DC/AC converter, and generating an AC power from an output side of the DC/AC converter according to the DC power; and
   detecting the DC power, and accordingly controlling an operation of the DC/AC converter;
   wherein when it is detected that an energy level of the DC power is less than or equal to a lower bound level, the step of controlling the operation of the DC/AC converter comprises:
   turning off the DC/AC converter.

2. The control method of claim 1, wherein after turning off the DC/AC converter, the step of detecting the DC power and accordingly controlling the operation of the DC/AC converter further comprises:
   detecting if the energy level of the DC power is greater than or equal to an upper bound level, wherein the upper bound level is greater than the lower bound level; and
   when it is detected that the energy level is greater than or equal to the upper bound level, turning on the DC/AC converter.

3. The control method of claim 1, further comprising:
   setting the lower bound level according to a rated output power of the DC/AC converter.

4. The control method of claim 1, wherein the energy level is a voltage level.

5. The control method of claim 1, wherein when it is detected that an energy level of the DC power is greater than or equal to an upper bound level, the step of controlling the operation of the DC/AC converter comprises:
   turning on the DC/AC converter.

6. The control method of claim 5, wherein after turning on the DC/AC converter, the step of detecting the DC power and accordingly controlling the operation of the DC/AC converter further comprises:
   detecting if the energy level of the DC power is less than or equal to a lower bound level, wherein the lower bound level is less than the upper bound level; and
   when it is detected that the energy level is less than or equal to the lower bound level, turning off the DC/AC converter.

7. The control method of claim 6, further comprising:
   setting the lower bound level according to a rated output power of the DC/AC converter.

8. The control method of claim 5, wherein the energy level is a voltage level.

9. An inverter apparatus, comprising:
   a direct current to direct current (DC/DC) converter, arranged for outputting a DC power;
   a direct current to alternating current (DC/AC) converter, coupled to the DC/DC converter, the DC/AC converter arranged for receiving the DC power, and generating an AC power according to the DC power; and a controller, coupled to the DC/AC converter, the controller arranged for detecting the DC power, and accordingly controlling an operation of the DC/AC converter;

wherein when the controller detects that an energy level of the DC power is less than or equal to a lower bound level, the controller turns off the DC/AC converter.

10. The inverter apparatus of claim 9, wherein after the controller turns off the DC/AC converter, the controller further detects if the energy level of the DC power is greater than or equal to an upper bound level; the upper bound level is greater than the lower bound level; and when the controller detects that the energy level is greater than or equal to the upper bound level, the controller turns on the DC/AC converter.

11. The inverter apparatus of claim 9, wherein the controller sets the lower bound level according to a rated output power of the DC/AC converter.

12. The inverter apparatus of claim 9, wherein the energy level is a voltage level.

13. The inverter apparatus of claim 9, wherein when the controller detects that an energy level of the DC power is greater than or equal to an upper bound level, the controller turns on the DC/AC converter.

14. The inverter apparatus of claim 13, wherein after the controller turns on the DC/AC converter, the controller further detects if the energy level of the DC power is less than or equal to a lower bound level; the lower bound level is less than the upper bound level; and when the controller detects that the energy level is less than or equal to the lower bound level, the controller turns off the DC/AC converter.

15. The inverter apparatus of claim 14, wherein the controller sets the lower bound level according to a rated output power of the DC/AC converter.

16. The inverter apparatus of claim 13, wherein the energy level is a voltage level.

* * * * *